United States Patent [19]
Krueger et al.

[11] Patent Number: 4,811,355
[45] Date of Patent: Mar. 7, 1989

[54] GAS LASER

[75] Inventors: Hans Krueger, Munich; Wolfgang Welsch, Baldham, both of Fed. Rep. of Germany

[73] Assignee: Siemens Aktiengesellschaft, Berlin and Munich, Fed. Rep. of Germany

[21] Appl. No.: 205,999

[22] Filed: Jun. 13, 1988

[30] Foreign Application Priority Data

Jun. 12, 1987 [DE] Fed. Rep. of Germany ....... 3719749

[51] Int. Cl.$^4$ ................................................. H01S 3/03
[52] U.S. Cl. ......................................... 372/61; 372/37; 372/34; 372/62
[58] Field of Search ..................... 372/61, 37, 62, 33, 372/34, 65

[56] References Cited

U.S. PATENT DOCUMENTS

| | | | |
|---|---|---|---|
| 3,464,024 | 8/1969 | Bell et al. | 372/37 |
| 3,681,710 | 8/1972 | Lary et al. | 372/37 |
| 4,035,741 | 7/1977 | Crisp et al. | 372/61 |
| 4,378,600 | 3/1983 | Hobart | 372/63 |
| 4,649,546 | 3/1987 | Schmid | 372/61 |
| 4,651,324 | 3/1987 | Prein et al. | 372/61 |
| 4,653,060 | 3/1987 | Barth et al. | 372/61 |
| 4,706,256 | 10/1987 | Sheng et al. | 372/100 |
| 4,730,334 | 3/1988 | Collins et al. | 372/37 |

OTHER PUBLICATIONS

"Multipole Containment of Laser Plasma" by Keller, in IBM Technical Disclosure Bulletin, vol. 22, No. 84, Jan. 1980, pp. 3,239 and 3,240.

Primary Examiner—Leon Scott, Jr.
Attorney, Agent, or Firm—Hill, Van Santen, Steadman & Simpson

[57] ABSTRACT

A gas laser having a housing terminated vacuum-tight and having magnets that are located in proximity to a capillary, in which excellent action of the magnets is achieved. The housing contains a housing tube and housing parts that are soldered vacuum-tight to the housing tube. At least one part of the magnets are located in the housing tube. The solder that joins the housing tube to the housing parts in a vacuum-tight fashion has a soldering temperature below 500° C. The invention can be advantageously utilized in helium-neon lasers.

9 Claims, 1 Drawing Sheet

GAS LASER

BACKGROUND OF THE INVENTION

The present invention is directed to a gas laser of the type having a vacuum-tight sealed housing which has a capillary extending at least partially in the housing and containing a discharge channel. Magnets are located in the proximity of the capillary, the magnetic field of the magnets penetrating the discharge channel in the capillary at least over a portion of its length. Such a prior art gas laser is disclosed in U.S. Pat. No. 4,035,741. In the prior art gas laser, magnets are located outside a housing which is sealed so that the housing is vacuum-tight and are located in the proximity of a capillary that projects over the housing. A relatively complex adjustment mechanism is required in order to adjust the magnets relative to the capillary. The arrangement disclosed basically covers only one part of the capillary.

IBM Technical Disclosure Bulletin, Vol. 22, No. 8A, January, 1980 discloses a similar arrangement in which a row of magnets is located in proximity to the discharge tube.

SUMMARY OF THE INVENTION

It is an object of the present invention to provide an improvement in the effect of the magnets and in being able to utilize especially cost-beneficial magnets.

This object is achieved by a gas laser according to the present invention. The gas laser has a housing tube and at least one housing part that is soldered to the housing tube so that the housing is sealed. At least one part of the magnets are contained in the housing tube. The solder has a soldering temperature which is not greater than 500° C. The described structure of the gas laser allows the introduction of magnets into the housing tube. However, it is known that magnets lose their magnetization when heated. The present invention provides that relatively cost-beneficial, commercially available magnets can be used in the described structure without a loss of magnetism when the soldering temperature for soldering the housing together does not exceed 500° C. The heating of the magnets during the soldering process thereby remains low enough that the magnetization is preserved. This is particularly critical when a subsequent magnetization cannot be carried out due to the desired configuration of the magnetic field.

The soldering temperature for soldering the housing so that it is vacuum-tight is preferably between about 200° C. and 400° C. The housing contains a housing tube of glass or ceramic and the housing parts are composed of sintered glass, whereby a glass solder then serves as the solder referred to above. Another advantageous structure has housing parts composed of metal and connected vacuum-tight to the housing tube composed of glass or ceramic via a soft solder. As known in the art, the glass or ceramic surface to be soldered is coated with metal whose melting point lies above the soldering temperature.

The magnets can be secured to the capillary with glass solder. The magnets can thereby have relatively simple shapes, for example, a cuboid shape and therefore, the tolerances of the dimensions of the magnets are not critical. The distance from the discharge channel is defined only by the capillary wall. The course of the magnetic field in the discharge channel that is formed by the capillary can also be set in a well-reproducible fashion with cost-beneficial magnets. Due to the protection of the magnets against mechanical stressing provided by the housing tube, even a fastening of the magnets that is only at certain locations in the region of its contact with the capillary has adequate strength without the risk of the magnets detaching during manipulation of the housing tube.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
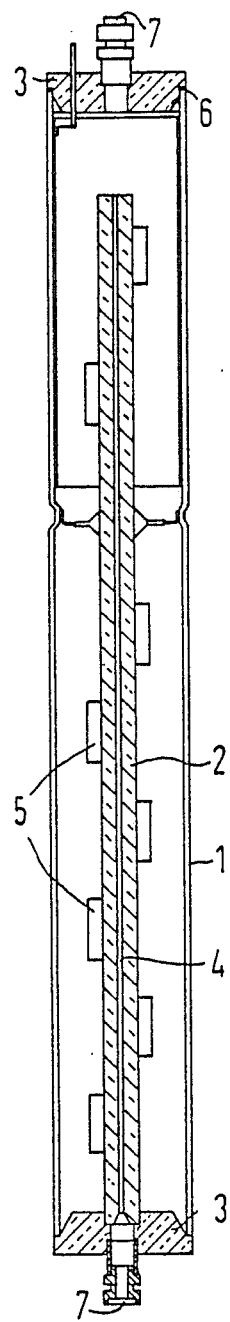
FIG. 1 is a cross-sectional view of a laser constructed according to the present invention.

The housing of a gas laser, shown in FIG. 1, is composed of a housing tube 1 and of two housing parts 3 connected thereto. The housing parts 3 are composed of sintered glass and are soldered to the housing tube 1 with glass solder. A capillary 2 that contains a discharge channel 4 for the laser discharge projects into the housing tube 1. Permanent magnets 5 are soldered, preferably with glass solder, to the capillary 2. Two mirrors 7 are secured to the corresponding housing part 3 in the extension of the discharge channel 4 and form the laser resonator.

The solder beteen the housing tube 1 and the housing part 3 in a further advantageous embodiment is a tin solder. In this case, the end faces of the housing tube 1 and the solder surface of the housing part 3 are coated with a metal coat as is known in the art.

Magnets 5 are soldered onto the capillary 2, these magnets 5 being situated in the vacuum-tight housing. The magnets 5 are secured to the capillary 2 with glass solder. They are dimensioned and distributed over the capillary 2 such that an optimum magnetic field configuration is guaranteed.

The solder that joins the housing tube 1 to the housing part 3 is designed for a soldering temperature of at most about 500° C., but is advantageous designed for a soldering temperature between about 200° C. and 400° C. Commercially available magnets are no longer demagnetized at 500° C. A desired field distribution in the capillary can be set by integrating appropriate magnets. Subsequent magnetization of the integrated magnets that would be required for a higher soldering temperature is not practical since the magnetic field for a subsequent magnetization usually also covers neighboring magnets and since no longer each magnetization direction can be established. When the solder is designed for a soldering temperature between 200° C. and 400° C., inexpensive, commercially available magnets can be utilized.

Tin solders are well-suited as the solder. In particular, a SnIn solder having a melting point between 200° C. and 400° C. can be advantageously used. The end face of the housing tube 1 and the corresponding soldering surface of the housing part 3 are provided with a layer of AgPd, AuPd and Ag. These metal layers, for example, can be applied with silk screening. The housing tube 1 can be advantageously composed of glass or ceramic and the housing part 3 can be composed of sintered glass.

In an embodiment of the invention wherein the housing tube 1 is composed of glass or ceramic and the housing part 3 is composed of sintered glass, solder in the form of a ring 6 of glass solder is used. An elastic union is thereby achieved and risk of breakage as a consequence of temperature-induced stresses is reduced even for different coefficients of thermal expansion of the joined parts.

Figure 2:
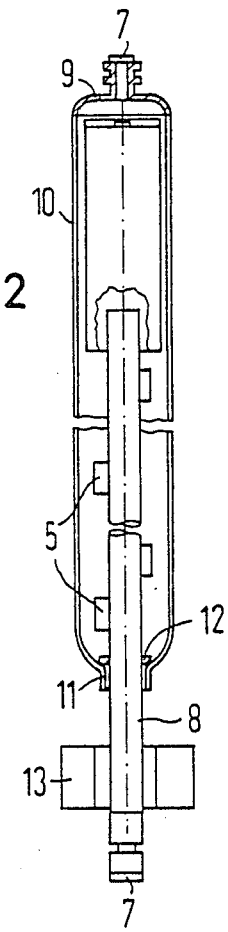
FIG. 2 is a cross-sectional view, partially broken away, of the laser of the present invention.

In FIG. 2, a housing part of sintered glass is replaced by a housing part 9 of metal having a temperature coefficient that is matched to that of a housing tube 10. A capillary 8 projects over the housing tube 10 and carries a mirror 7 at its end face. The housing tube 10 has a tapered end 11 in which the capillary 8 is soldered vacuum-tight with glass solder 12. In addition to the inventively arranged magnets 5, magnetic field source 13 can be arranged in a known way at the exposed part of the capillary 8 in this embodiment.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A gas laser having a housing sealed vacuum-tight and having a capillary extending at least partially in the housing and containing a discharge channel, magnets being located in proximity to the capillary, a magnetic field of the magnets penetrating the discharge channel in the capillary at least over a portion of its length, comprising the housing containing a housing tube and at least one housing part that is soldered vacuum-tight to the housing tube; at least one part of the magnets being located in the housing tube; and a solder that joins the housing tube to the housing part in a vacuum-tight fashion having a soldering temperature of at most about 500° C.

2. The gas laser according to claim 1, wherein the housing tube is composed of ceramic and the housing part is composed of sintered glass; and wherein the solder is present in the form of a ring of glass solder.

3. The gas laser according to claim 1, wherein the housing tube is composed of glass and the housing part is composed of sintered glass; and wherein the solder is present in the form or a ring of glass solder.

4. The gas laser according to claim 1, wherein the solder has a soldering temperature between about 200° C. and 400° C.

5. The gas laser according to claim 4, wherein the solder is a Sn solder.

6. The gas laser according to claim 1, wherein the housing tube is composed of ceramic and the housing part is composed of sintered glass; and wherein the solder is a SnIn solder having a melting point of about 200° C. through 400° C.; and wherein an end face of the housing tube and a corresponding soldering surface of the housing part are provided with a layer of metal.

7. The gas laser according to claim 6, wherein the metal is AgPd.

8. The gas laser according to claim 6, wherein the metal is AuPd.

9. The gas laser according to claim 6, wherein the metal is Ag.

* * * * *